April 23, 1968

R. C. BRADLEY 3,379,591

FILAMENT WINDING OF TUBULAR ARTICLES WITH INCORPORATION OF
CUT LENGTHS OF ROVING DURING WINDING

Filed Dec. 18, 1963

INVENTOR

RICHARD C. BRADLEY

BY

ATTORNEYS

April 23, 1968 R. C. BRADLEY 3,379,591
FILAMENT WINDING OF TUBULAR ARTICLES WITH INCORPORATION OF
CUT LENGTHS OF ROVING DURING WINDING
Filed Dec. 18, 1963 4 Sheets-Sheet 2
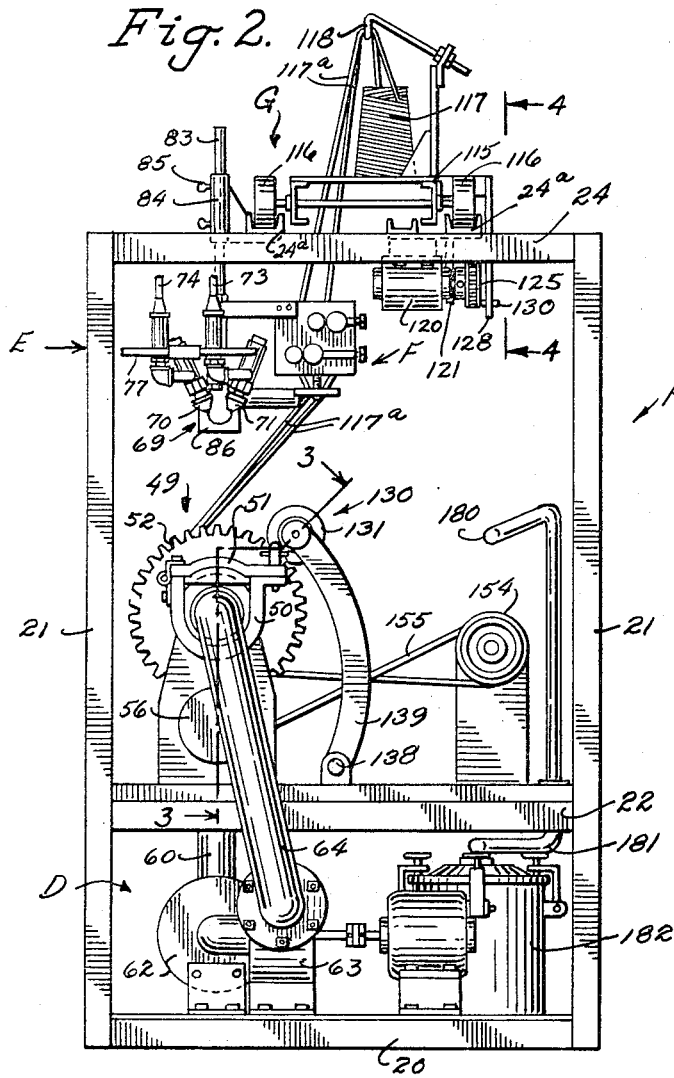
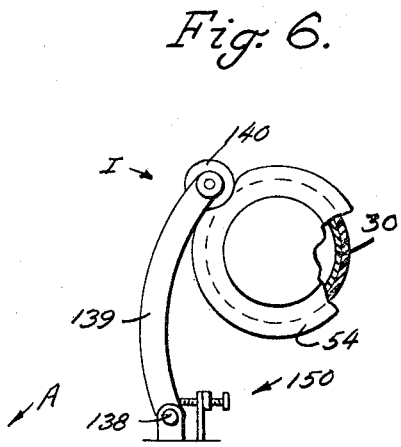
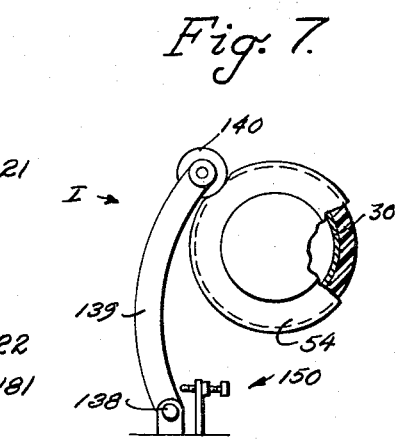
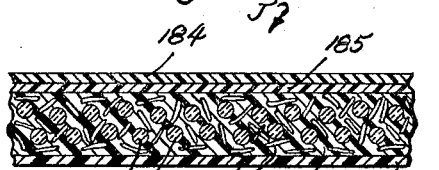
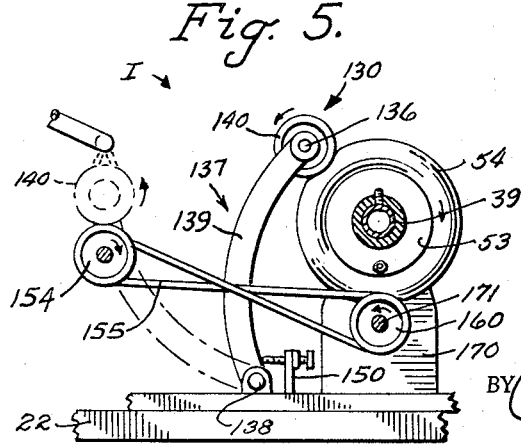
INVENTOR
RICHARD C. BRADLEY
BY
ATTORNEYS

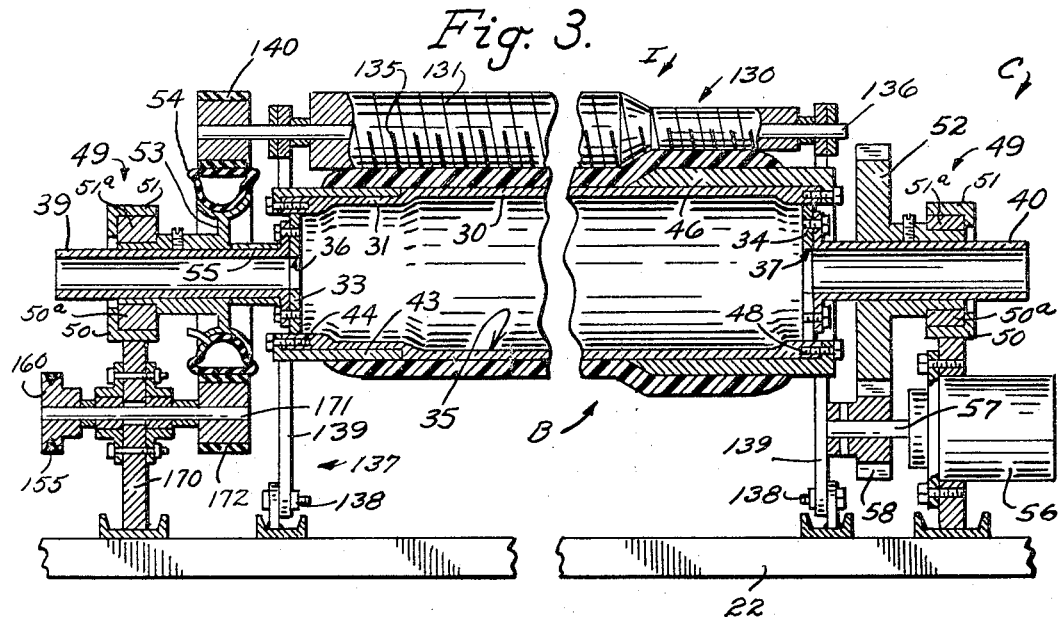
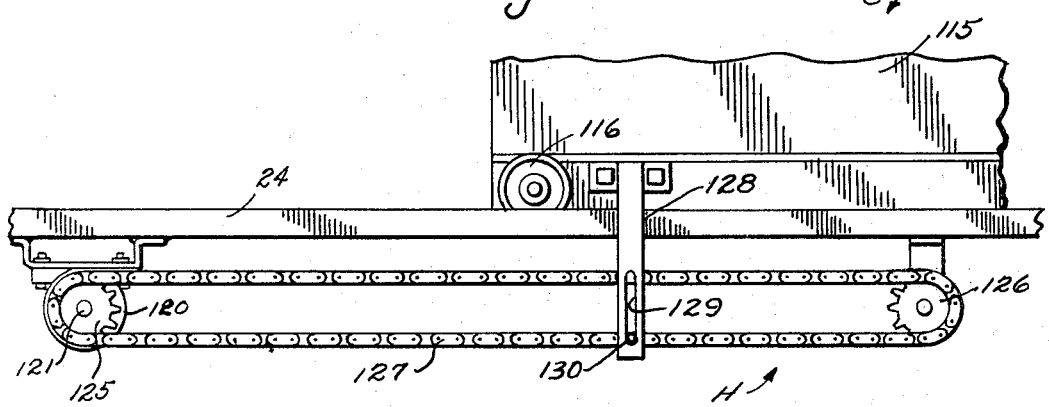
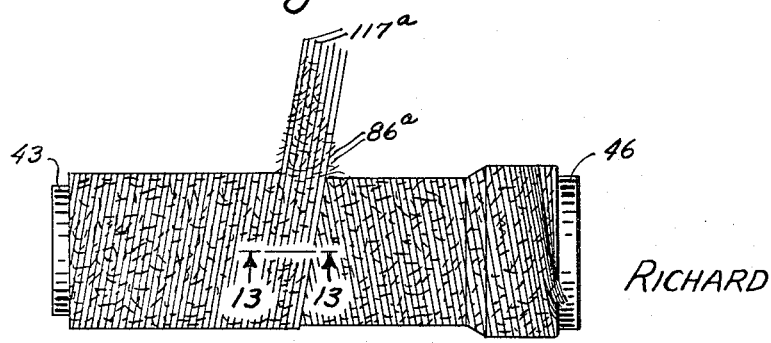
INVENTOR
RICHARD C. BRADLEY

United States Patent Office 3,379,591
Patented Apr. 23, 1968

3,379,591
FILAMENT WINDING OF TUBULAR ARTICLES
WITH INCORPORATION OF CUT LENGTHS OF
ROVING DURING WINDING
Richard C. Bradley, 3501 NW. 9th Ave.,
Fort Lauderdale, Fla. 33309
Continuation-in-part of application Ser. No. 118,912,
June 22, 1961. This application Dec. 18, 1963, Ser.
No. 331,549
2 Claims. (Cl. 156—173)

This invention relates to improvements in tubular articles and to methods and apparatus for forming the same.

This application is a continuation-in-part of my copending application Ser. No. 118,912, filed June 22, 1961, now abandoned, entitled "Apparatus and Method for Forming Tubular Articles."

The formation of articles by the spray depositing of plastic compositions, such as alkyd polyester and epoxy types of resins, wherein a promoted resin, catalyzed resin, and in selected instances, aggregates or glass roving, are simultaneously deposited upon a form has heretofore only been practical when the articles to be formed are of an open construction, such as chairs, seats, tables, etc., or for the over-coating of items of an open construction such as wooden boats, swimming pools, etc. The primary object of this invention is the provision of apparatus whereby tubular articles, such as pipe and the like, may be formed by the spray depositing of plastic compositions.

A further object is the provision of methods for forming tubular articles such as pipe and the like by the spray depositing of plastic compositions.

A further object is the provision of apparatus for the forming of tubular articles, such as pipe and the like, by the spray depositing of plastic compositions, such apparatus having a novel mandrel and including a cooperative drive relationship between the mandrel and depositing gun.

A further object is the provision of apparatus for the removal of air bubbles and compacting and arranging of a spray deposited plastic composition.

A further object is the provision of improved strand tensioning means whereby when a filament wound tubular article is to be provided, the strands of the filament will be maintained under proper tension.

A further object is the provision of improved tubular articles of plastic composition.

Other objects and advantages of the invention will be apparent during the course of the following detailed description, taken in connection with the accompanying drawings, forming a portion of this specification, and in which drawings:

FIG. 2 is a side view taken from the right-hand side of FIG. 1.

FIG. 3 is an enlarged transverse sectional view taken substantially on the line 3—3 of FIG. 2.

FIG. 4 is an enlarged fragmentary sectional view taken substantially on the line 4—4 of FIG. 2.

FIG. 5 is a somewhat diagrammatic side view taken substantially on the line 5—5 of FIG. 1.

FIGS. 6 and 7 are diagrammatic views similar to FIG. 5 illustrating the drive relationship between the mandrel and the compacting and arranging roller.

FIG. 8 is an enlarged perspective view of the spray depositing and strand tensioning apparatus of my invention.

FIG. 9 is an enlarged sectional view taken substantially on the line 9—9 of FIG. 1.

FIG. 10 is a rear view of the apparatus of FIG. 9.

FIG. 11 is a transverse sectional view taken substantially on the line 11—11 of FIG. 9.

FIG. 12 is a somewhat diagrammatic view illustrating filament winding of a tubular article.

FIG. 13 is an enlarged sectional view of a tubular article, taken substantailly on the line 13—13 of FIG. 12.

Figure 1:
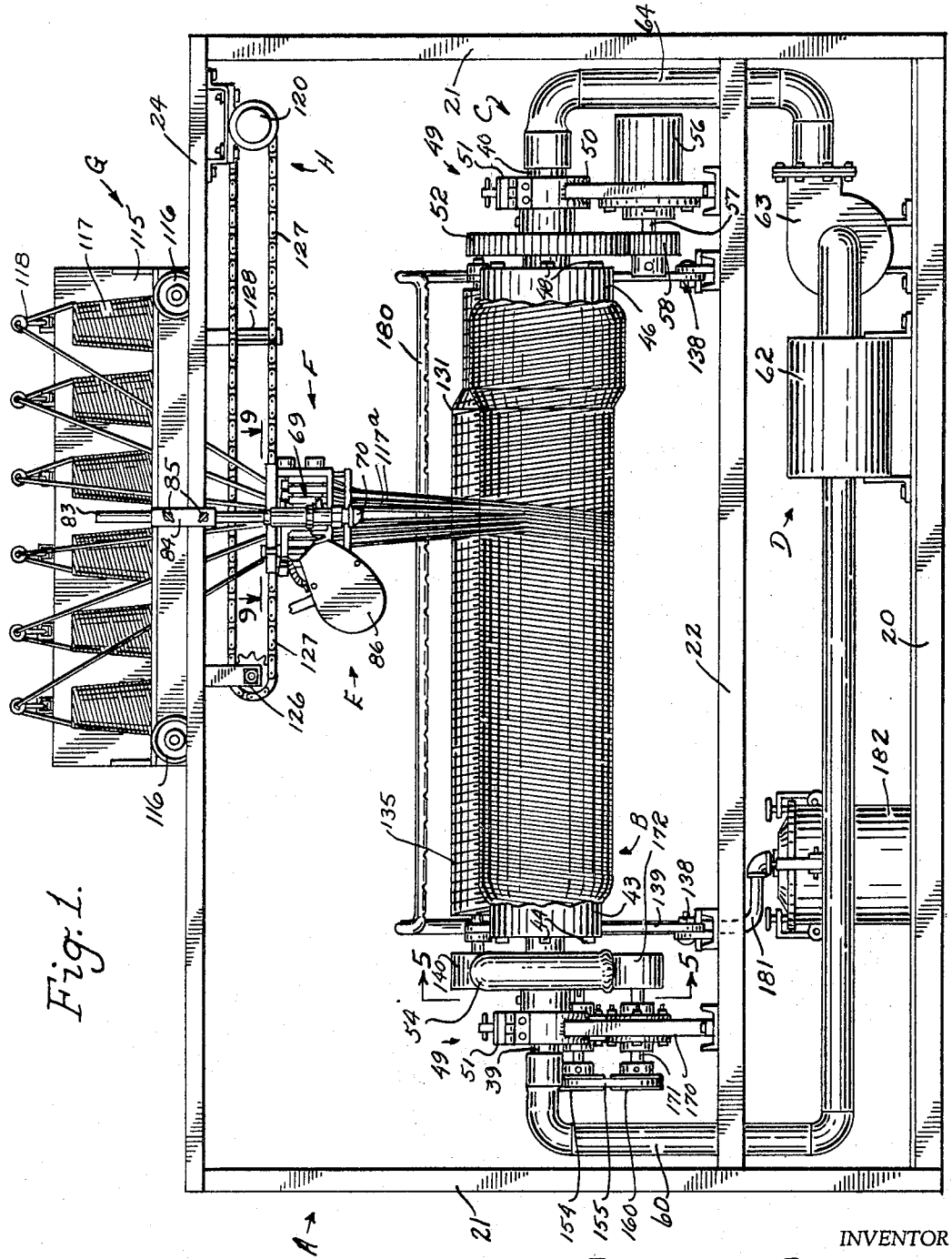
FIG. 1 is a front view of my improved apparatus.

In the drawings, wherein for the purpose of illustration is shown a preferred embodiment of the invention, and wherein similar reference characters designate corresponding parts throughout the several views, the letter A may generally designate the frame of my improved apparatus; B the mandrel; C the mandrel drive means; D the mandrel heating and cooling means; E means for depositing the material to be molded upon the mandrel B; F strand tensioning means; G strand carriage means; H strand carriage drive means; I means for compacting the material deposited upon the mandrel B; and J an improved tubular article formed by my apparatus.

The frame A is preferably of a skeletal nature, including a base 20, vertically extending side portions 21; a mandrel supporting portion 22; and track supporting portion 24. The frame is preferably compactly constructed so that it may be mounted on a vehicle, for field operation thereof.

In the drawings, the mandrel supporting portion 22 has been shown closer to the base portion 20 than it would be in actual practice, the same being so arranged so that the apparatus may be conveniently illustrated in the relatively small space provided on each sheet of drawing. In actual practice, the mandrel supporting portion 22 would preferably be spaced apart from the base portion 20 a sufficient distance to place the mandrel B at a convenient height for the operator of the apparatus.

The mandrel B preferably includes a main cylindrical body portion 30 having a portion 31 thereof which is of smaller outer diameter than the remainder, and including end portions 33 and 34. The portions 30, 31, 33 and 34, define chamber 35. The end walls 33 and 34 are respectively provided with ports 36 and 37 to which are respectively connected conduits 39 and 40. The conduits 39 and 40 extend axially of the mandrel B, and provide axles about which the mandrel B may be rotated.

Portion 31 of the mandrel B is provided with a fillet sleeve 43, fillet sleeve 43 extending along the portion 31 and having an outer diameter the same as that of the body portion 30. The fillet sleeve 43 is removably secured to the mandrel B such as by screws 44.

To the end of body portion 30 opposite the portion 31, is mounted a sleeve 46, the sleeve 46 extending along the body portion 30 and providing an enlarged outer diameter at one end of the mandrel B, for a purpose which will be subsequently described. The sleeve 46 is removably secured to the mandrel B, such as by screws 48.

The mandrel B is preferably of some material which is readily expansible and contractible by the application of heat or cold thereto, such as aluminum. This is important to my invention, inasmuch as the mandrel B will be heated by the application of a heated fluid through the tubes 39 and 40 during the spray depositing operation, the fluid being injected into the chamber 35 through one of the conduits, and thence passing through the chamber 35 and out through the other of the conduits, the heat from the fluid expanding the mandrel B. The heat of the mandrel B will likewise aid in the curing of the plastic compositions spray deposited upon the mandrel B. After the desired thickness of the plastic composition has been spray deposited upon the mandrel B, a cold fluid will be circulated through the chamber 35, causing the mandrel B to contract, so that the plastic article formed thereupon may be removed from the contracted mandrel.

It is, of course, within the scope of my invention to substitute other types of expansible and contractible mandrels for that shown and described. For instance, a segmental cylinder might be utilized, which could be merely retracted or knocked down after the tubular article had been formed thereupon. Expansible and contractible mandrels of this type are well known in the art.

Suitable bearing means 49 may be provided for rotatably supporting the conduits 39 and 40. Such bearing means may be conventional pillow blocks, or might be some form of quick release bearing, such as that shown in the drawings, so that the mandrel may be readily removed from the apparatus. The bearing means shown in the drawings preferably includes a U-shaped base portion 50 having a bushing portion 50$^a$ and a cover portion 51 having a bushing portion 51$^a$. This construction is provided so that the mandrel may be used until the tubular article formed thereupon has been completed, whereupon the cover portion 51 of bearing means 49 would be raised and the mandrel lifted from base portion 50 for further treatment of the tubular article and removal from the mandrel at another station, and a new mandrel put in place for the making of another tubular article.

Mounted upon the conduit 40 may be a gear 52, which gear 52 cooperates with the mandrel drive C for powered rotation of the mandrel B, as will be subsequently described.

Mounted upon the conduit 39 may be a bracket 53 which supports an air inflated tire 54, the tire 54 cooperating with the compacting and arranging means I, as will be subsequently described. Suitable spacer plates 55 may be mounted upon the conduits 39 and 40 for correctly positioning the mandrel B intermediate the bearing means 49.

Mandrel drive means C preferably includes a motor 56 mounted upon the frame A, which motor 56 has a drive shaft 57 upon which is mounted a gear 58 which intermeshes with and drives the gear 52 mounted on the conduit 40. The motor 56 is preferably hydraulically operated, so that it may be driven in direct relationship to the drive of the carriage drive means H, as will be subsequently described.

Mandrel heating and cooling means D preferably include a conduit 60 secured to the conduit 39, which conduit 60 leads to a heater 62, which heater 62 is interconnected to blower 63, a conduit 64 leading from blower 63 to the conduit 40. The form of invention herein shown and described is for the heating and cooling of the mandrel B by air, although it is to be understood that it is not necessarily limited to air heating and cooling, but that other fluids, such as water, may be utilized. In the heating operation, the heater 62 is activated, the blower 63 is started, and air is continuously circulated from the blower 63 through conduit 64, through conduit 40, through the mandrel B, through conduit 39, through conduit 60, through heater 62, and back to the blower 63. A closed heating circuit is thereby provided. When the cooling operation is to be performed, the heater 62 may be disconnected from the blower, in which case air at room temperature may be picked up by the blower 63 and circulated through the mandrel B. In the event that the temperature of the air surrounding the apparatus is too high to provide the desired cooling of the mandrel B a refrigeration unit may be interconnected thereto for providing refrigerated air for circulation through the mandrel B.

Means E for the spray depositing of plastic compositions may be similar to that disclosed in my copending application Ser. No. 134,650, filed Aug. 29, 1961 now U.S. Patent No. 3,123,307, the same including a gun 69 having nozzles 70 and 71, which nozzles 70 and 71 are angled so that the streams emitted therefrom will intersect and be intermixed prior to impinging upon the mandrel B. Rather than the trigger operated guns as disclosed in the aforementioned application Ser. No. 134,650, filed Aug. 29, 1961, the guns shown in the drawings are air operated, the air operation of such guns being well known in the trade. Suitable conduits 73 and 74 lead respectively to the nozzles 70 and 71, for injecting a promoted resin through one of the nozzles, and a catalyzed resin through the other of the nozzles. An air hose 77 is provided, having a terminal portion 78 leading to one of the nozzles, and a terminal portion 79 leading to the other of the nozzles. The gun 69 preferably includes a body portion 82, upon which are mounted the nozzles 70 and 71. A shaft 83 is secured to the body portion 82, the shaft 83 extending through a sleeve 84 mounted upon the carriage supporting portion 24 of the frame A. The shaft 83 is slidably mounted through the sleeve 84, so that the spray depositing means E may be positioned in a desired spaced apart relationship from the mandrel B. Set screws 85 may be provided upon the sleeve 84 for fixing the shaft 83 at a desired spaced apart position from mandrel B.

Also mounted upon the body portion 82 is a cutter 86 for supplying cut lengths of glass roving 86$^a$ into the spray stream emitting from the nozzles 70 and 71, so that a resin-glass plastic composition may be sprayed deposited upon the mandrel B. The cutter 86 is driven by an air motor 87 to which leads a conduit 88 from the main air conduit 77. The gun itself forms no part of the present invention, it being understood that any suitable form of apparatus for spray depositing suitable compositions upon the mandrel B may be substituted for the gun shown and described.

Strand tension means F preferably includes side plates 90 and 91, a top plate 93, a bottom plate 94, and a depending guide plate 95. The plates 93, 94, and 95, are each provided with openings 97 for guiding the strands. It is desirable to have a plurality of individually tensioned strands mounted in juxtaposition for filament winding about the mandrel B, and I have thus provided individually rotatable roller means 100 and 101 for effecting strand tension.

The roller means 100 acts upon the strands fed through the lower openings, as shown in FIG. 9, the same including rubber wheels 102 mounted upon shaft 103, spacers 104 being provided for maintaining the wheels 102 in spaced apart position. The rubber wheels 102 engage metallic rollers 106, each of which are individually rotatably mounted on shaft 107 and maintained in a spaced apart position by spacers 108. The rubber wheels 102 are maintained in proper compression upon the rollers 106 by the tension screws 110. By operation of the screws 110, the rubber wheels 102 can be compressed to a greater or lesser extent upon the rollers 106, the greater the compression the more the resistance of these wheels to rotation in accordance with the pull of the strand, thereby providing increased strand tension, and vice versa. A cylinder 112 depends below the openings 97 leading to the roller means 100, the sleeve 112 terminating just short of the roller 102, so that the strand fed through the opening 97 intercommunicates with the sleeve 112 will be guided into its proper strand tensioning position.

The roller means 101 is identical to the roller means 100, and like reference numerals with a prime character have therefore been applied thereto.

Strand carriage means G preferably includes a body portion 115 having wheels 116 which are received within and ride along the track 24$^a$ of frame A. The body portion 115 may be provided with appropriate spindles (not shown) for holding spools 117 of roving strands 117$^a$, and sheaves 118 may be provided for guiding the strands to the strand tension means F. The carriage means G is freely movable longitudinally along the track 24$^a$ of frame A, the same being moved by the carriage drive means H.

Carriage drive means H preferably includes a drive motor 120 mounted upon the frame A, which drive motor 120 has a shaft 121 which is interconnected to and drives a gear 125. An idler gear 126 is mounted in a spaced-apart position from the drive motor 120 on the frame A. A roller chain 127 is entrained about the gears 125 and 126. A depending bar 128, having a slot 129 therein is mounted upon the body 115, the slot 129 receiving a lug 130 mounted upon roller chain 127. As the roller chain rotates about the sprockets 125 and 126, the lug 130 will move therewith, pulling the shaft 128. Inasmuch as the shaft 128 is rigidly secured to the body 115, the movement thereof will move the strand carriage means G.

As shown in the drawings, the strand carriage drive means H is preferably located to one side of the point at which the strands are fed into the strand tension means F, so that catching of the strands is avoided. In the confined spaces of the drawing, the carriage drive means is, as a matter of fact, located closer to the strand tension means F than is preferred, the preferred construction being to position the drive means far enough to one side to completely avoid any overlap of the carriage drive with the strand tension means.

The motor 120 is preferably hydraulically driven, and interconnected with the motor 55 driving the mandrel B, for cooperative drive relationship.

Compacting and arranging means I preferably includes roller means 130 comprising an elongated roller 131 which extends for the length of mandrel B and is axially parallel thereto. The roller 131 is preferably provided with a continuous spiral thread 135 throughout its entire length, and I have found that eight threads per inch along the roller 135 is an optimum design, providing a roller that acts upon the plastic composition deposited upon the mandrel B in such a manner as to squeeze out any air bubbles that may be entrapped therein and will serve to arrange any aggregate or fibers deposited within the plastic composition. The continuous spiral construction of the threads 135 prevents permanent grooving of the plastic composition engaged thereby. In the event that a pure plastic composition, without aggregate or filaments is to be provided upon the mandrel B, the roller 131 may be smooth. The roller 131 is mounted upon a shaft 136 which is rotatably supported upon the bracket means 137. The bracket means 137 is preferably pivotally mounted upon the frame A by pivot means 138, and includes an arcuate supporting shaft 139 so that a compensating balanced effect is obtained whereby the weight of the roller 131 is disposed toward the mandrel B, when in compacting and arranging position.

The shaft 136 is provided, at one end thereof, with a roller 140 which is in juxtaposition for abutment against the tire 54. The weight of the compacting and arranging means I being disposed toward the mandrel B, the roller 140 will be pressed into engagement with the tire 54. The tire 54 is inflated to a degree whereby sufficient frictional contact is provided between the roller 140 and the tire 54. As the plastic composition builds up upon the mandrel B, as shown in FIGS. 6 and 7, the roller 131 will ride along the outer surface of the deposited plastic composition, and the tire 54 will, due to the inflation thereof, remain in contact with the roller 140.

Stop means 150 is mounted in juxtaposition with respect to the shaft 139 of the compacting and arranging means I, so that the roller 131 may be spaced apart from the mandrel B at the beginning of the spray depositing operation, so that a substantial thickness of the plastic composition may be permitted to be built up along the mandrel B prior to contact therewith of the roller 131. If this were not the case, the roller 131 would have a tendency to wipe the mandrel B clean. This is particularly true in the case of the depositing of a pure resin spray deposit. When filament is utilized, however, the tendency of the roller 131 to wipe the mandrel clean is less, so that the stop can be adjusted to provide virtually instantaneous contact with the mandrel B.

Inasmuch as the plastic composition deposited upon the mandrel B is in a substantially fluid condition, it is necessary to rotate the roller 131 at substantially the same surface speed of rotation as the mandrel B, and this is effected by means of the contact of the roller 140 with the tire 54.

When the tubular article has been formed, and the roller 131 moved away from the mandrel B, it is desirable to provide some means whereby any plastic composition which may have adhered to the roller 131 may be removed. I have therefore provided an idler roller 154 mounted upon the frame A, in juxtaposition for abutment against the roller 140 when the roll 131 is in its rearmost position. This roller 154 is arranged to rotate in abutment with the roller 140 so that the roller 131 is rotated in the same direction as it would be rotating when in contact with the tire 54. This is a further safeguard in avoiding wiping action of the roll 131 with respect to mandrel B and also avoids frictional loss. Roller 154 is driven by means of a belt 155 which is entrained about a sheave 160 mounted upon a shaft 171 rotatably carried by bracket 170. To shaft 171 is attached a roller 172 which is in constant abutment with and rotated by tire 54.

In order to provide for the cleaning of the roller 130, I have provided a perforated tube 180, extending the entire length of roller 131, which tube 180 intercommunicates with a hose 181 leading to a tank 182, through which appropriate solvents may be stored and ejected into the tube 180, for washing the roller 131.

In operation, the motors 56 and 120 are actuated, causing rotation of the mandrel B and movement of the carriage means G along the track 24, and the blower 63 and heater 62 are actuated, whereby hot fluid is passed through the mandrel B, causing the same to expand. Some form of release agent is then preferably sprayed or wiped on by hand upon the mandrel B, either through the gun 69 or by a separate gun. I have found that in use of the apparatus for making pipes of synthetic resin, that film forming type polyvinyl alcohol provides an excellent release agent. The polyvinyl alcohol cures almost instantaneously upon hitting the hot mandrel, peels away from the finished article, and is water soluble for facile removal of any residue. A layer 184 of polyvinyl alcohol is therefore provided upon the mandrel B, the same being very thin, usually less than a thousandths of an inch thick. A paste wax, applied by a cloth might also be used.

In the use of the apparatus for making pipes of polyester resin, a "gel-coat" polyester resin coating 185 may be sprayed upon the polyvinyl alcohol. This provides a coating for the interior of the pipe, sealing the same so that there will be no "weeping." Various other plastic compositions, which are resistant to materials which may be desired to be conducted through a pipe formed upon the mandrel B, may be spray deposited upon the polyvinyl alcohol coating. This interior film for the pipe may be very thin, usually from ten to thirty thousandths of an inch thick. It is preferably air inhibited, so that it remains tacky and will bond itself completely to the resin utilized to form the main body of the tubular article. It has been a problem, in previously provided laminated pipe, to prevent the same from "weeping" or "osmosis" of the fluids contained within the pipe.

The apparatus is then in preparation for receiving the main body of the tubular article to be formed upon the mandrel B. If such article is to be filament wound, one end of the strands 117a are preferably initially attached to the mandrel B, such as by a small piece of adhesive tape, masking tape, or the like, so that such strands will be pulled, by rotation of the mandrel B, through the strand tensioning means F, and be wound about the pipe, as the carriage G moves along the track 24. After the strands have thus been attached to the mandrel, the gun 69 is actuated, spray depositing chopped roving 86a and a catalyzed resin and a promoted resin upon the strands and the mandrel B. It is to be noted particularly that with the use of my apparatus it is not necessary to prewet the strands, which has been the previously required practice in making any form of filament wound tubular articles. The provision of the overhead spray depositing of the resin and the fibers holds fall-out of the fibers and resin to a minimum, reducing unwanted atomization and fumes. The tension of the strands will pull the same into the resin 186 which has been spray deposited upon the mandrel B. As a matter of fact, the compacting and arranging roller 131 is not required to be utilized when the apparatus is used for the making of filament wound tubular articles, inasmuch as the tension upon the filaments will compact the resin 186 deposited upon the mandrel B. In the making of the tubular articles utilizing filament strands, resins, and the chopped roving the chopped roving will be distributed in a jack straw fashion throughout the resin, bonding the filaments together, as shown in FIG. 13. In previously provided apparatus for filament wound tubular articles, the same has been unable to sustain any axial stress which would cause separation of the filaments. The chopped roving serves to bond the filaments together.

It is, of course, to be understood that it is not absolutely necessary to utilize either the filaments or the chopped roving in the making of tubular articles upon my apparatus. If desired, the filaments may be omitted, so that a tubular article composed merely of resin and chopped roving may be provided; the chopped roving may be omitted, providing a tubular article composed of filament strand and resin; or both the filament strand and the chopped roving may be omitted, providing a pure resin tubular atricle.

During the course of the coating of the mandrel B with the plastic composition, the hot fluid will be continuously circulated through the chamber 35, thereby maintaining the mandrel B in an expanded condition.

After the desired thickness of resin has been spray deposited upon the mandrel B, the strands 117$^a$ will be cut from the strand tensioning means F, and the loose ends compressed into the deposited plastic composition, either by means of a hand held roller or by the roller 131, if it is used, and the spray depositing operation is stopped. The roller 131 is then moved to its position as shown in dot-and-dash lines in FIG. 5, and the solvent sprayed thereupon, to remove any unwanted accumulation of resin therefrom.

The blower 63 is disconnected from the heater 62, and a cool fluid is circulated through the chamber 35. Circulation of the cooling fluid causes contraction of the mandrel B so that the tubular article formed thereupon may be removed.

A coating 187 may be applied exteriorly of the tubular article as a finish. Such coating may be another layer of "gel coat." This exterior layer may contain a colored pigment when the article formed is to be used in such a manner as to be seen.

Insofar as dismantling of the mandrel B for removal of the tubular article formed thereupon is concerned, sleeves 43 and 36 are first preferably removed. It will be noted that the sleeve 46 forms an expanded portion of the tubular article, so that in the event that the apparatus is utilized for the making of pipe, a bell-shaped end is provided at one end of the pipe, within which the opposite ends of the next section of pipe may be inserted and fixed in position.

In some instances it may be desired to trim the ends of the pipe while it is still upon the mandrel B. For this purpose I have provided a removable sleeve 46 and fillet 43. Upon removal of the sleeve 46 and fillet 43, it will be noted that a space is provided at the ends of the article which require trimming, between the tubular article formed upon the machine and the mandrel B, so that any cutting tool utilized to trim that end of the pipe will not likely come in contact with the mandrel B, thereby scarring the same.

Insofar as particulars are concerned as to the formation of the tubular article, the resin may be injected through the gun 69 from seven hundred and fifty pounds to three thousand pounds per square inch, hydraulic pressure. I have discovered that the optimum pressure is seven hundred and fifty pounds per square inch. The roving tension, for sixty end roving, is preferably four and one-half pounds. The mandrel preferably rotates one revolution while the carriage traverses a distance which is equal to one-half of the circumference of the mandrel. This creates a helix angle of 26½°. Greater helix angles can, of course, be obtained when desired, simply by increasing traverse carriage speed ratio to mandrel rotation.

I preferably use sixty end strand roving, having a tensile strength of approximately 240,000 p.s.i.

Insofar as the ratio of aggregate to resin is concerned, in the filament wound roving and chopped fiber resin composition, the ratio may vary from 100% resin, up to 76% chopped fiber and roving and 24% resin.

In the use of chopped roving alone, the ratio may vary from 52% glass and 48% resin, to 100% resin alone.

As to percentages in a typical Fiberglas filament wound and Fiberglas chopped roving tubular article formed, taking a five pound three ounce cross section, the Fiberglas total approximates three pounds nine and three-eighths ounces, and the resin one pound nine and five-eighths ounces.

Although the term "plastic composition" and "tubular articles" have been used in describing the present invention throughout the specification, it is to be understood that the invention is not so limited, but is to be construed as covering all forms of materials that may be spray deposited upon a mandrel such as that shown and described, and the mandrel itself may be modified to provide a form for other than tubular articles, for instance, by making the mold of an elliptical shape and collapsible rather than rigid.

It is likewise to be understood that the length of the mandrel is not limited to that shown and described, but the mandrel may be exceptionally elongated for forming continuous lengths of tubular articles, such as pipe and the like.

Various changes in the shape, size and arrangement of the parts may be made to the form of the invention herein shown and described, without departing from the spirit of the invention or the scope of the following claims.

I claim:

1. The method of forming tubular articles upon an expansible and contractible rotatable mandrel which incloudes the steps of expanding the mandrel; contemporaneously rotating the mandrel, winding continuous strand means about the mandrel in a generally helical manner, directing and depositing a liquid spray of a promoted and catalyzed synthetic resin upon the rotating mandrel by a plurality of passes along the longitudinal axis of the mandrel, the liquid spray being directed over the strand means for wetting the same with the liquid spray prior to the winding of the strand means about the mandrel, and feeding cut lengths of roving into the liquid spray in a manner to wet the cut lengths of roving with the liquid spray and to spray deposit the wetted cut lengths of roving in a jackstraw fashion upon the mandrel in an intermingled relationship with the wetted strand means; compacting and arranging the material applied to the mandrel in a cylindrical form about the mandrel; permitting the promoted and catalyzed synthetic resin upon the mandrel to harden; contracting the mandrel; and removing the thus formed tubular article from the mandrel.

2. The method of forming a matter carrying pipe upon a rotatable mandrel which includes the steps of rotating the mandrel, depositing a layer of material on the mandrel which is substantially impervious to, wear-resistant to, non-erodable by, and insoluble by the matter to be carried by the pipe and is capable of being deposited on the mandrel in an unsolidified tacky state; contemporaneously winding continuous strand means about the mandrel in a generally helical manner, directing and depositing on the rotating mandrel a spray of a promoted and catalyzed synthetic resin in an unsolidified plastic state so as to bond itself to the layer of material previously deposited and the layer of material previously deposited will bond itself to such synthetic resin, the spray being directed over the strand means for wetting the same with the spray prior to the winding of the strand means about the mandrel, and feeding cut lengths of roving into the spray in a manner to wet the cut lengths of roving with the spray and to spray deposit the wetted cut lengths of roving in a jackstraw fashion upon the mandrel in an intermingled relationship with the wetted strand means; compacting and arranging the substances applied to the mandrel in a cylindrical form about the mandrel; permitting the unsolidified substances on the mandrel to harden; and removing the thus formed article from the mandrel.

References Cited

UNITED STATES PATENTS

| | | | |
|---|---|---|---|
| 2,974,388 | 3/1961 | Ault. | |
| 3,055,148 | 9/1962 | Christy | 264—255 |
| 1,387,067 | 8/1921 | Murray | 25—1285 |
| 2,816,323 | 12/1957 | Munger | 264—255 |
| 1,802,120 | 4/1931 | Maynard. | |
| 1,969,101 | 8/1934 | Semon | 264—308 |
| 2,614,058 | 10/1952 | Francis. | |
| 2,966,715 | 1/1961 | Vianini | 264—310 X |
| 3,042,567 | 7/1962 | King | 264—309 X |
| 1,719,738 | 7/1924 | Wayne | 156—425 |
| 2,106,018 | 1/1938 | Raiche | 156—425 |
| 1,165,677 | 12/1915 | King | 264—309 |
| 2,165,099 | 7/1939 | Hansen | 264—309 |
| 2,467,999 | 4/1949 | Stephens | 138—144 |
| 3,121,446 | 2/1964 | Richardson et al. | 138—144 |

FOREIGN PATENTS 314,942  2/1934  Italy.

OTHER REFERENCES

Modern Plastics Articles, "And Now-Pontoons of Reinforced Plastics," In Modern Plastics, April 1961, pp. 100–102.

Modern Plastics Editorial Feature, Spray-up, In Modern Plastics, September 1961, pp. 89–92.

Mylis, Ed. S., Spray Reinforced Plastics, In Glass Industry, October, 1961, pp. 583–584.

ALEXANDER H. BRODMERKEL, *Primary Examiner.*

EDWARD V. BENHAM, ALFRED L. LEAVITT,
*Examiners.*

C. L. HOUCK, B. SNYDER, A. KOECKERT,
*Assistant Examiners.*